Dec. 29, 1925.
P. SIEVER
AUTOMOBILE DOOR SIGN
Filed May 14, 1925      2 Sheets-Sheet 1
1,567,337
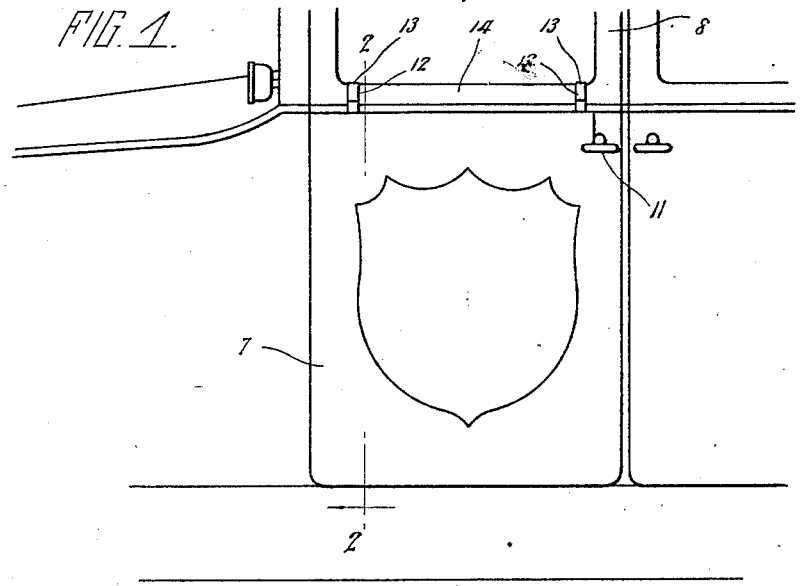
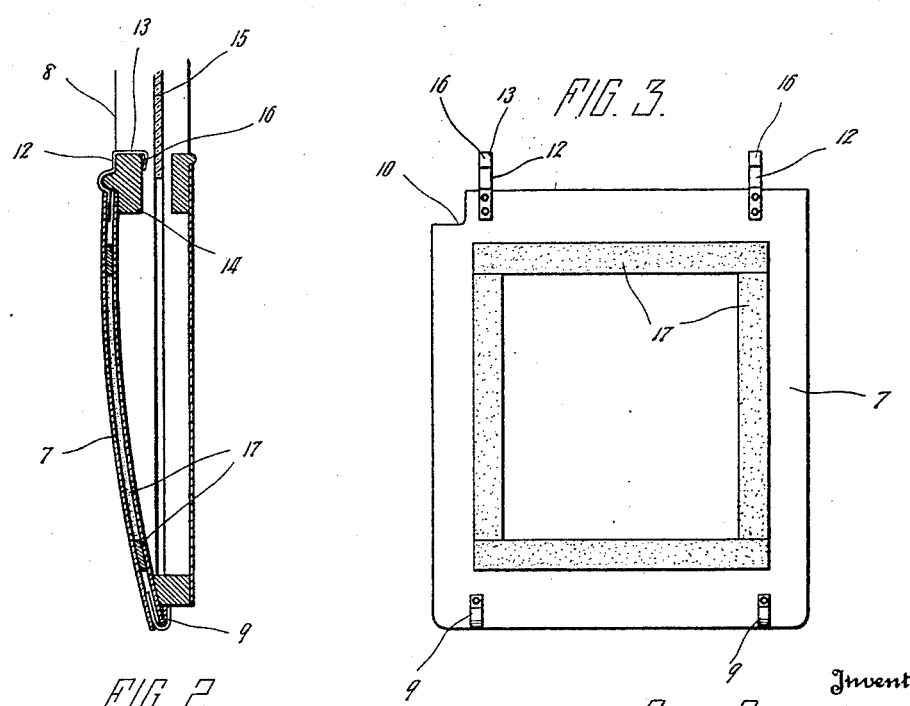
Inventor
PAUL SIEVER Dec. 29, 1925.  1,567,337
P. SIEVER
AUTOMOBILE DOOR SIGN
Filed May 14, 1925   2 Sheets-Sheet 2
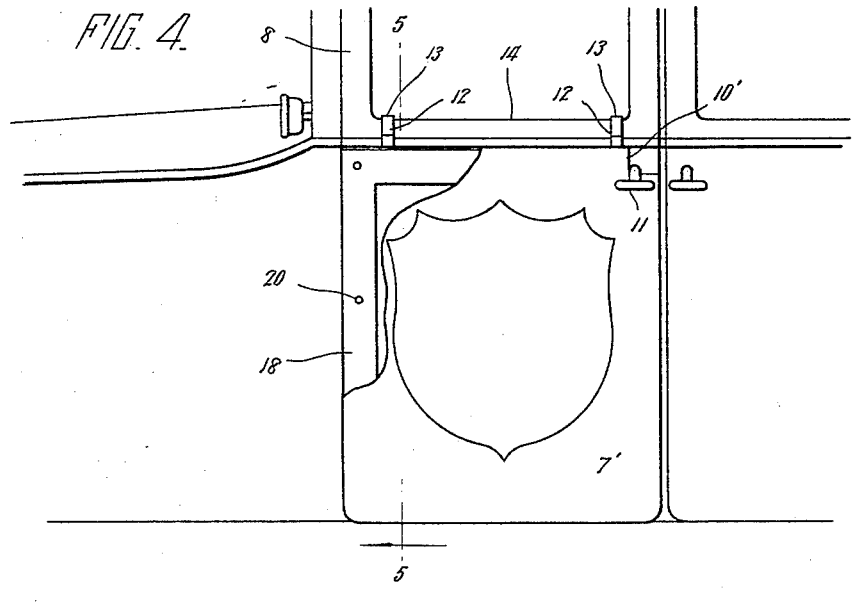
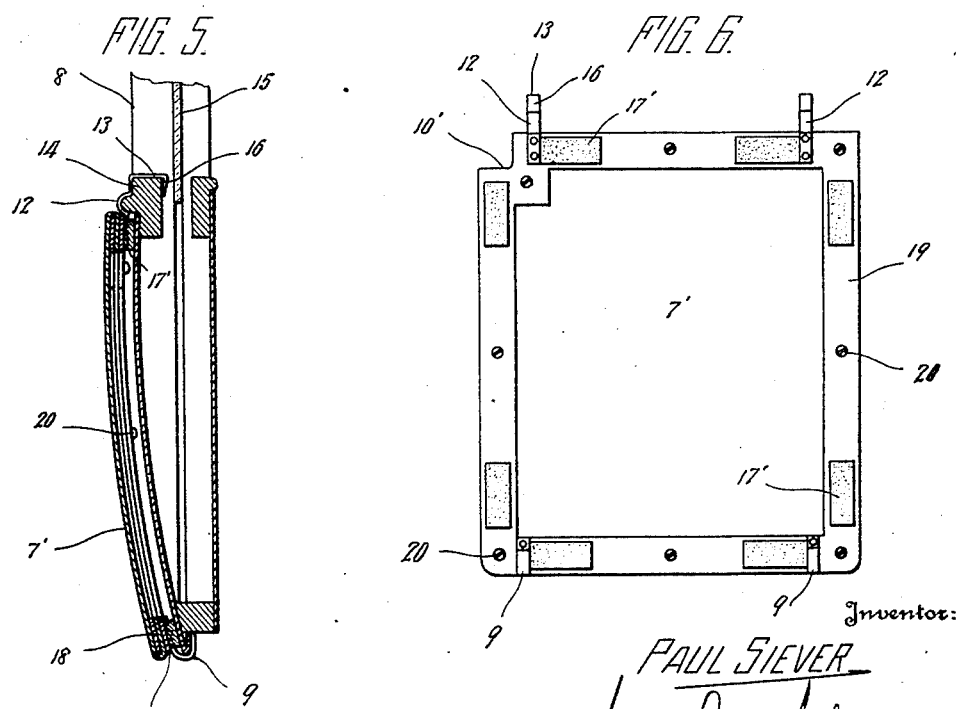
Inventor:
PAUL SIEVER
By Monroe E. Miller
Attorney.

Patented Dec. 29, 1925.

1,567,337

UNITED STATES PATENT OFFICE.

PAUL SIEVER, OF MINNEAPOLIS, MINNESOTA.

AUTOMOBILE DOOR SIGN.

Application filed May 14, 1925. Serial No. 30,321.

*To all whom it may concern:*

Be it known that I, PAUL SIEVER, a citizen of the United States, residing at Minneapolis, in the county of Hennepin and State of Minnesota, have invented certain new and useful Improvements in Automobile Door Signs, of which the following is a specification, reference being had therein to the accompanying drawing.

The present invention relates to signs, especially those for use on automobiles, and aims to provide a novel and improved sign attachment for the door of an automobile which may be quickly applied and removed.

Another object of the invention is the provision of a sign plate or panel for the door of an automobile and novel means for attaching said sign plate to the door to enable the sign plate to be quickly applied and removed.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a side elevation showing the sign plate as applied to the door of an automobile.

Fig. 2 is a vertical section on the line 2—2 of Fig. 1.

Fig. 3 is a rear view of the device when removed.

Fig. 4 is a side elevation illustrating a modification, a portion of the sheet or panel being broken away.

Fig. 5 is a vertical section on the line 5—5 of Fig. 4.

Fig. 6 is a rear view of the modified device when removed.

In carrying out the invention there is provided a plate or panel 7 of sheet metal or other suitable stiff material which is cut so as to conform to the outline of the lower portion of the door of an automobile, and the outer surface of said plate is preferably finished to agree with the exterior finish of the automobile body, in order that when the device is applied it will harmonize with the body finish to have the appearance of a permanent fixture.

In order to attach the plate 7 to the automobile door 8, hooks 9 are riveted or otherwise secured to the lower edge portion of the plate 7 in rear thereof and engage upwardly across the lower edge of the door 8 by shifting the plate 7 upwardly. The plate 7 may be cut away, as at 10, if necessary, to accommodate the handle 11 of the door. Leaf springs 12 are riveted or otherwise secured to the upper edge portion of the plate 7, preferably in rear thereof, and project upwardly. Said springs are bent rearwardly to provide hooks 13 to engage over a cross member 14 of the door frame in front of the glass window panel 15, and the bills 16 of the hooks are bent forwardly slightly, as seen in Fig. 2, so as to press against the rear side of the frame member 14 and hold the upper edge of the plate 7 snugly in place against the door.

In applying the plate 7 it is positioned at the outer side of the door slightly below its final position, so that the hooks 9 may be moved upwardly into engagement with the lower edge of the door. The hooks 13 are then sprung upwardly to move over the frame member 14. Said hooks are sprung downwardly into engagement with said frame member, the bills 16 engaging in rear of said member. Said leaf springs 12 are of resilient material in order that they may be freely flexed in applying and removing the plate 7. By springing the hooks upwardly the upper edge of the plate 7 may be swung outwardly to disengage said plate from the door.

Strips 17 of felt or other soft material are secured to the rear surface of the plate 7 to bear against the outer side of the door, and prevent the plate 7 from scratching or marring the finish of the door when applying and removing the plate 7. The strips 17 also prevent slight vibration of the plate 7 from scratching or injuring the finish of the door by keeping the plate 7 spaced from the door, as seen in Fig. 2.

The plate 7 may contain any suitable sign or advertisement on the outer surface thereof, and the device may be used for converting a pleasure automobile into a taxicab. Thus, the plate 7 may contain a taxicab sign, and when the automobile is used for pleasure or other purposes, other than for taxicab service, the plate 7 is quickly removed.

Figs. 4, 5 and 6 illustrate a modification wherein the sheet or panel may be detached for replacement. Thus, the sheet or panel 7' which may be of cloth or other suitable fabric or material, is detachably secured to a frame comprising the front and rear frame members 18 and 19, respectively, which are detachably secured together by means of screws 20, said screws passing through the rear or inner frame 19 and being screwed into the front or outer frame member 18. The edge portions of the sheet 7' are bent back and clamped between the frame members 18 and 19, with said sheet stretched across the outer side of the frame member 18. The frame members 18 and 19 have the notches or recesses 10' to accommodate the handle 11 of the door 8, and the hooks 9 and springs 12 are secured to the rear frame member 19 to engage the door 8 in substantially the same manner as hereinbefore described. The felt or cushioning strips 17' are secured to the frame member 19. By using the frame for the sheet or panel 7', said sheet or panel may be detached from the frame by separating the frame members 18 and 19, and another sheet or panel may be substituted, thus providing for changeable signs or advertisements using the same frame.

Having thus described the invention, what is claimed as new is:—

A device of the character described comprising a sign panel to be applied to the door of an automobile, hooks connected to the lower edge portion of the panel to engage upwardly with the lower end of the automobile door, and resilient hooks connected to the upper edge portion of the panel and adapted to be sprung upwardly so as to pass over a cross member of the door and then engage behind said member for holding the panel in place against the door.

In testimony whereof I hereunto affix my signature.

PAUL SIEVER.